United States Patent
Iwasa et al.

(10) Patent No.: US 8,294,315 B2
(45) Date of Patent: Oct. 23, 2012

(54) INNER-ROTOR BRUSHLESS MOTOR

(75) Inventors: Takeshi Iwasa, Yokohama (JP); Hiromasa Masuta, Hirosaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/569,539

(22) Filed: Sep. 29, 2009

(65) Prior Publication Data

US 2010/0084934 A1 Apr. 8, 2010

(30) Foreign Application Priority Data

Sep. 30, 2008 (JP) ................. 2008-254001

(51) Int. Cl.
*H02K 5/04* (2006.01)
*H02K 29/08* (2006.01)

(52) U.S. Cl. ............ 310/91; 310/216.008; 310/216.009; 310/216.136

(58) Field of Classification Search .............. 310/91, 310/216.008, 216.136, 40 MM, 216.009
See application file for complete search history.

(56) References Cited

U.S. PATENT DOCUMENTS

| | | | | |
|---|---|---|---|---|
| 2003/0214197 A1* | 11/2003 | De Luca et al. | ................ | 310/218 |
| 2004/0007934 A1* | 1/2004 | Michaels et al. | ................ | 310/254 |
| 2007/0024135 A1* | 2/2007 | Simofi-Ilyes et al. | .......... | 310/89 |
| 2008/0024019 A1 | 1/2008 | Sakuma | | |
| 2010/0084934 A1* | 4/2010 | Iwasa et al. | ................ | 310/91 |
| 2010/0146769 A1* | 6/2010 | Simofi-Ilyes et al. | ..... | 29/525.11 |
| 2010/0231084 A1* | 9/2010 | Kinoshita | ............ | 310/216.009 |
| 2012/0025649 A1* | 2/2012 | Takahashi et al. | ............. | 310/91 |

FOREIGN PATENT DOCUMENTS

| | | |
|---|---|---|
| DE | 20202154 | 8/2002 |
| JP | 03-235629 A | 10/1991 |
| JP | 2002-330570 A | 11/2002 |
| JP | 2005-073409 A | 3/2005 |
| JP | 2007-189785 A | 7/2007 |
| JP | 2010110198 A * | 5/2010 |

* cited by examiner

*Primary Examiner* — Quyen Leung
*Assistant Examiner* — David Scheuermann
(74) *Attorney, Agent, or Firm* — Canon U.S.A., Inc., IP Division

(57) ABSTRACT

An inner-rotor brushless motor includes a holding member configured to hold a stator core. The holding member includes a mounting surface disposed perpendicular to a shaft and brought into contact with a mating member in which the inner-rotor brushless motor is installed; bent portions integrated with the mounting surface, bent upward so as to be substantially perpendicular to the mounting surface, and configured to hold the outer circumferential surface of the stator core; and mounting flanges used for fastening the motor to the mating member. The mounting surface, the bent portions, and the mounting flanges are integrated with each other.

6 Claims, 15 Drawing Sheets

PHASE POSITION IN FIG. 6

PHASE POSITION IN FIG. 2

INNER-ROTOR BRUSHLESS MOTOR

BACKGROUND OF THE INVENTION

1. Field of the Invention

The present invention relates to brushless motors installed in, for example, business machines, and in particular, relates to inner-rotor brushless motors including rotors that rotate inside the motors.

2. Description of the Related Art

Inner-rotor DC brushless motors are used for business machines such as laser printers and copiers. Since such an inner-rotor DC brushless motor includes a rotor that rotates inside a stator core, the inertia of the rotor is small compared with that of an outer-rotor motor due to the small rotor diameter, resulting in high controllability. Japanese Patent Laid-Open No. 03-235629 describes an example of an inner-rotor DC brushless motor.

FIG. 16 is a cross-sectional view of a motor described in Japanese Patent Laid-Open No. 03-235629. This motor includes a stator core 1A, stator coils 2 wound around the stator core 1A, a rotor 3 disposed inside the stator core 1A, a frame (outer cylinder) 4A formed of a mild steel sheet into which the stator core 1A is press-fitted such that the outer circumferential surface thereof is brought into close contact with the frame 4A, and a front bracket 5 fitted with the opening of the frame 4A. The frame 4A and the front bracket 5 are fixed by bolts 6.

In this manner, the stator core 1A described in Japanese Patent Laid-Open No. 03-235629 is held by press-fitting the stator core 1A into the frame 4A and by fitting the frame 4A with the front bracket 5.

Since the stator core 1A in the motor described in Japanese Patent Laid-Open No. 03-235629 is held on the premises that the stator core 1A is press-fitted into the frame 4A and the frame 4A is fitted with the front bracket 5 as described above, a reduction in the number of parts, i.e., a further reduction in costs on this regard is demanded.

SUMMARY OF THE INVENTION

The present invention is directed to an inner-rotor brushless motor including a stator core constituted by stator-core blocks connected to each other via thin-walled portions, each stator-core block including a tooth portion around which an energizing coil is wound inside the stator-core block; a rotor disposed inside the stator core and including driving magnets, a rotor yoke that holds the driving magnets, and a shaft coaxially fastened with the rotor yoke; and a holding member configured to hold the stator core. The holding member includes a mounting surface disposed perpendicular to the shaft and brought into contact with a mating member in which the inner-rotor brushless motor is installed; bent portions integrated with the mounting surface, bent upward so as to be substantially perpendicular to the mounting surface, and configured to hold the outer circumferential surface of the stator core; and mounting flanges used for fastening the motor to the mating member. The mounting surface, the bent portions, and the mounting flanges are integrated with each other.

Further features of the present invention will become apparent from the following description of exemplary embodiments with reference to the attached drawings.

DESCRIPTION OF THE EMBODIMENTS

Preferred exemplary embodiments of the present invention will now be illustrated. The individual exemplary embodiments described below will be helpful in understanding a variety of concepts of the present invention from the generic to the more specific. Further, the technical scope of the present invention is defined by the claims, and is not limited by the following individual exemplary embodiments.

First Exemplary Embodiment

The structure of an inner-rotor brushless motor according to a first exemplary embodiment will now be described with reference to FIGS. 1 and 2.

Structure of Inner-Rotor Brushless Motor

Figure 1:
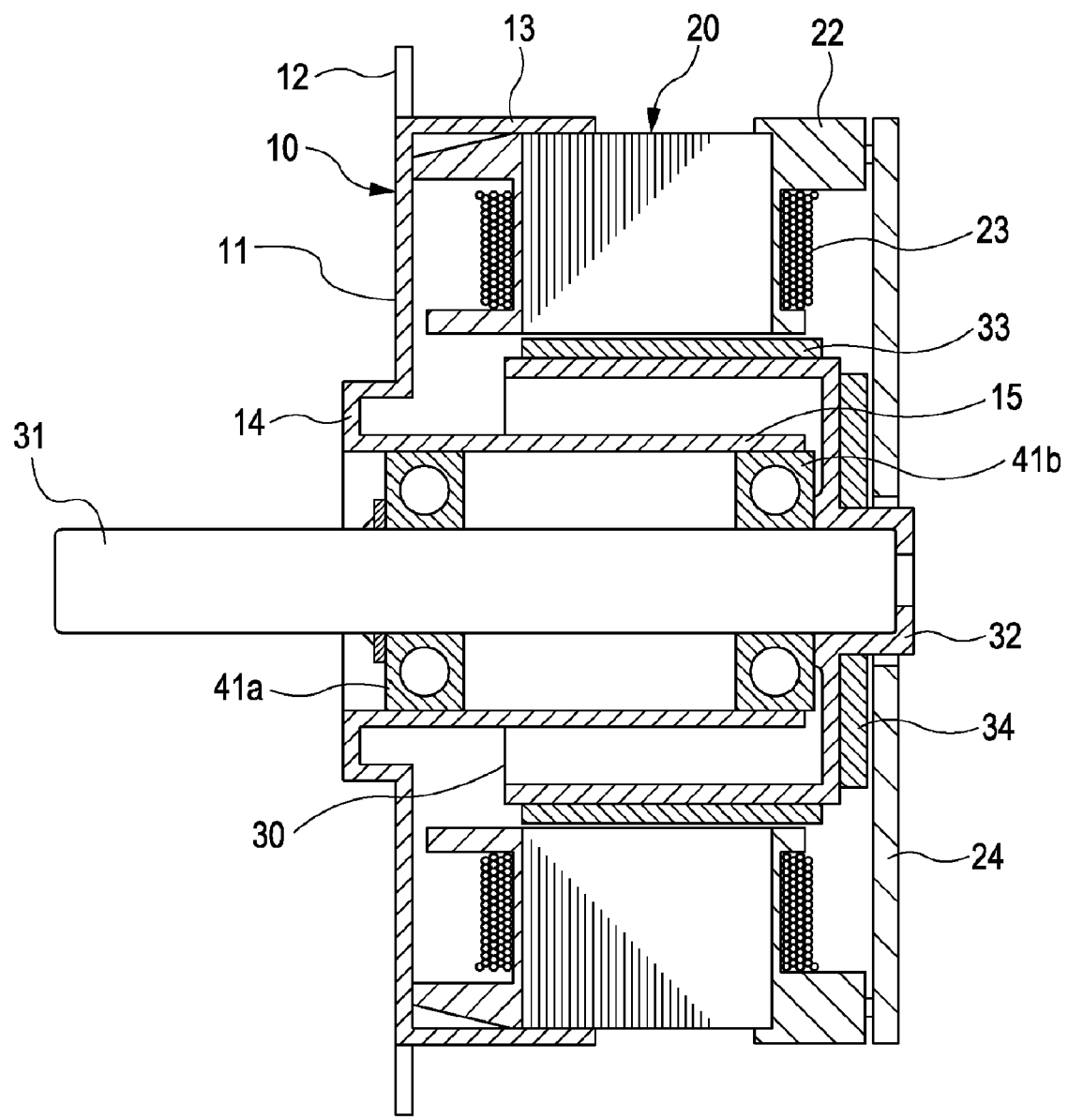
FIG. 1 is a longitudinal sectional view of an inner-rotor brushless motor according to a first exemplary embodiment of the present invention.
Figure 2:
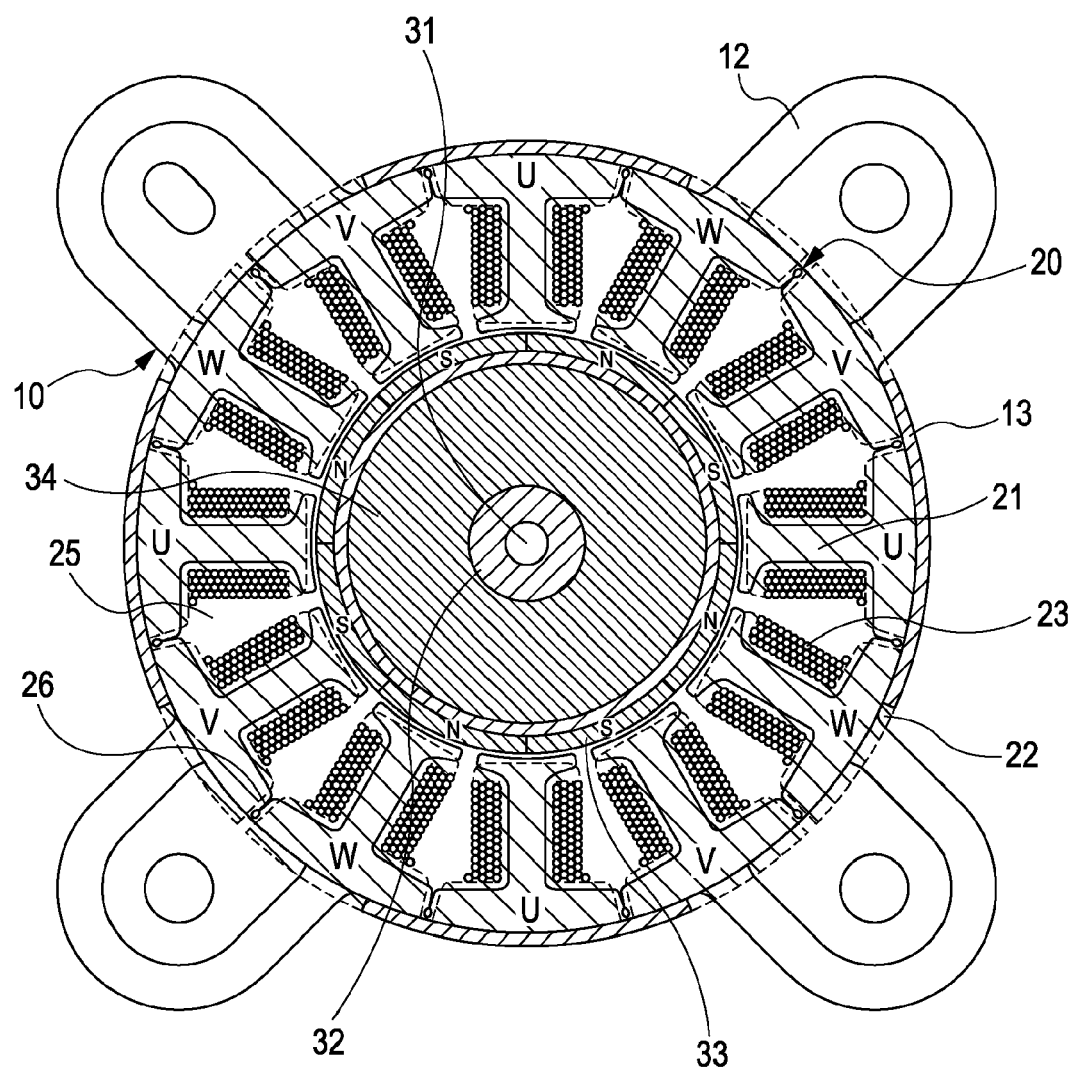
FIG. 2 is a transverse sectional view of the inner-rotor brushless motor according to the first exemplary embodiment.

FIGS. 1 and 2 are a longitudinal sectional view and a transverse sectional view, respectively, of an inner-rotor brushless motor. A housing 10 includes a mounting surface 11 that holds the bottom surface of a stator core 20, separate mounting flanges 12 at which the motor is screwed to a mating member, and separate bent portions 13 serving as an outer cylinder that holds the outer circumferential surface of the stator core 20. The housing 10 serves as a holding member that holds the stator core 20, and can be referred to as, for example, a frame or a bracket. The housing 10 is also integrated with a mating portion 14 engaged with the mating member when the motor is installed and positioning the motor in a radial direction thereof and a bush portion 15 supporting a shaft 31 so as to be rotatable in a circumferential direction via ball bearings 41a and 41b. A rotor 30 includes the shaft 31, a rotor yoke 32, driving magnets 33, and a magnet 34 used for detecting rotational speed of the rotor. The shaft 31, the rotor yoke, and the like in the rotor 30 are coaxially fastened.

The structure of the stator core 20 will now be described in detail. The stator core 20 includes a core base having twelve tooth portions 21 formed of laminated magnetic steel sheets and a core mold 22 integrated with each other. The core mold 22 have a function of insulating energizing coils 23 and a function of being a base for fixing a control board 24 to the stator core 20 and for fixing the stator core 20 to the housing 10. The stator core 20 is ring-shaped, and the tooth portions face inward in the radial direction. Spaces between two adjacent tooth portions are referred to as slot openings 25. The thickness in the radial direction of boundary portions 26 between two adjacent slots is the smallest in an outer peripheral portion (back yoke) of the stator core. In this specification, the term "slots" used in relation to the boundary portions 26 refers to portions between two adjacent boundary portions 26 (thin-walled portion 26). These portions can also be referred to as stator-core blocks in the sense of parts of the stator core partitioned by the boundary portions 26. When the term "stator-core blocks" is used, it can be said that twelve stator-core blocks are connected in order via the thin-walled portions so as to constitute a stator core shown in FIG. 2. Although the term "slots" is used in relation to the boundary portions in the description below, the term "slots" can be replaced with the term "stator-core blocks" as just described. Moreover, the term "boundary portions" can also be replaced with the term "thin-walled portions". The shape of the boundary portions 26 between two adjacent slots is not limited to that shown in FIG. 2, and the boundary portions 26 can have any other shapes. The energizing coils 23 wound around the tooth portions are classified into three kinds of coils of U-phase coils, V-phase coils, and W-phase coils, and are arranged as shown in FIG. 2. The stator core 20 and the housing 10 are fastened to each other at the bent portions 13 by laser welding.

The control board 24 includes three Hall elements (not shown) for detecting the position of the rotor 30 and a pre-driver IC (not shown) for generating and outputting phase-energizing signals that energize the energizing coils 23 of the three phases at appropriate timings on the basis of control signals from the outside and signals from the Hall elements. The control board 24 also includes switching elements (not shown) such as field-effect transistors (FETs) that control the energization of the energizing coils 23 by the phase-energizing signals output from the pre-driver IC and patterns (not shown) for detecting the magnetic flux of the magnet 34 so that the rotational speed of the rotor is detected.

Energizing Sequence and Principle of Rotation

Figure 3:
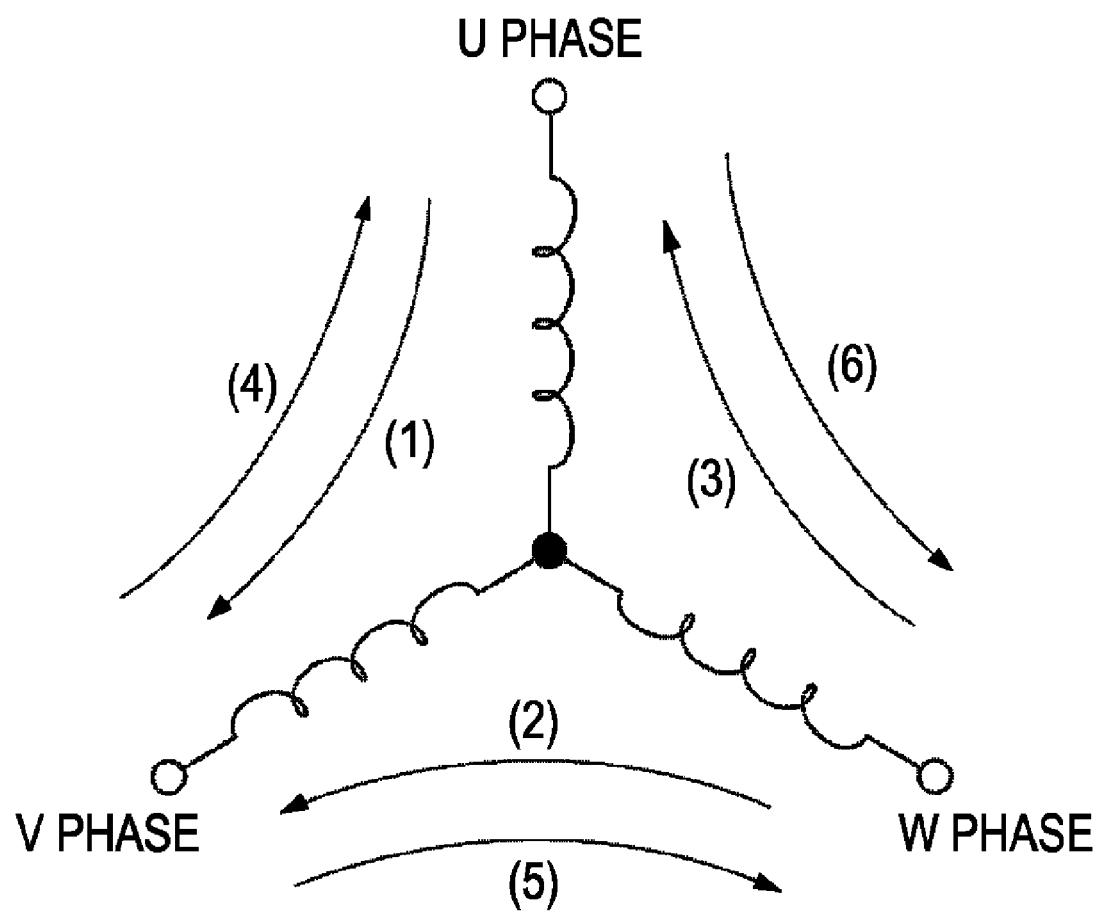
FIG. 3 illustrates an example sequence for energizing coils.

FIG. 3 illustrates an energizing sequence for applying currents to the energizing coils of the three phases in a 120° conduction mode in the inner-rotor brushless motor described with reference to FIGS. 1 and 2.

While the motor is in a steady rotation, a state of applying a current from the U-phase coils to the V-phase coils is defined as a starting state (1). The coil-energization state is switched from the starting state (1) to a state (2) in which a current is applied from the W phase coils to the V phase coils, a state (3) in which a current is applied from the W phase coils to the U phase coils, a state (4) in which a current is applied from the V phase coils to the U phase coils, a state (5) in which a current is applied from the V phase coils to the W phase coils, and a state (6) in which a current is applied from the U phase coils to the W phase coils in this order, and transition of these six states is repeated. This means that coils of two phases existing in two adjacent slots are sequentially energized, that is, magnetic fluxes pass between coils of two adjacent phases, and sequentially transfer to coils of the adjacent phases.

For example, when coils of two phases (for example, the U phase and the V phase) are energized, the north poles are formed at the tips of the tooth portions 21 around which the coils of one of the phases are wound, and the south poles are formed at the tips of the tooth portions 21 around which the coils of the other phase are wound in accordance with the intensity of the magnetic fluxes. These magnetic poles and those of the driving magnets 33 serving as permanent magnets attract or repel each other, thereby generating a torque of the motor. In this manner, the rotor 30 rotates.

The inner-rotor brushless motor according to this exemplary embodiment will now be compared with an inner-rotor brushless motor before improvement so that the features of the inner-rotor brushless motor according to this exemplary embodiment will be evident.

First Feature

Figure 4:
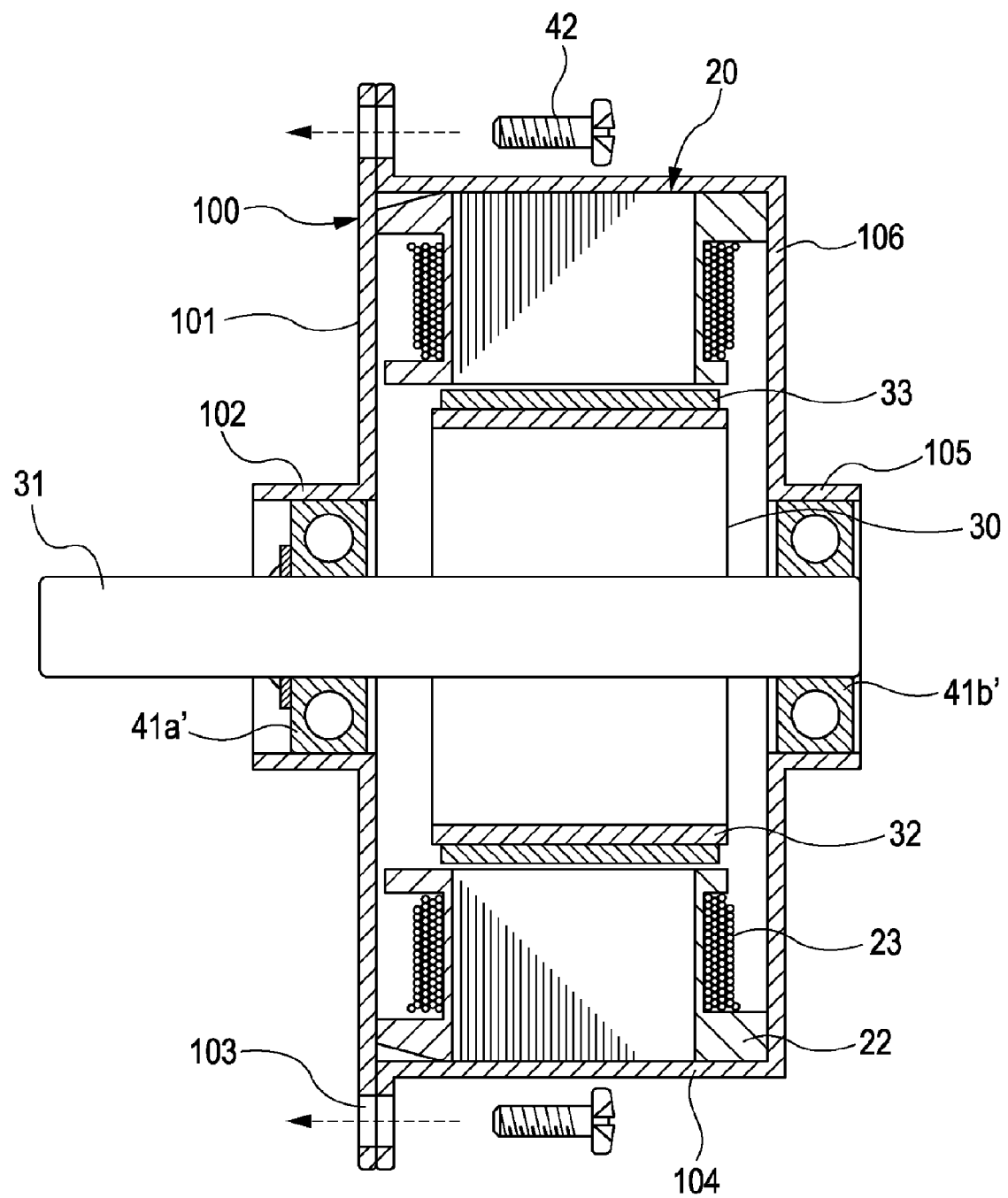
FIG. 4 is a longitudinal sectional view of an example motor housing before improvement.
Figure 5:
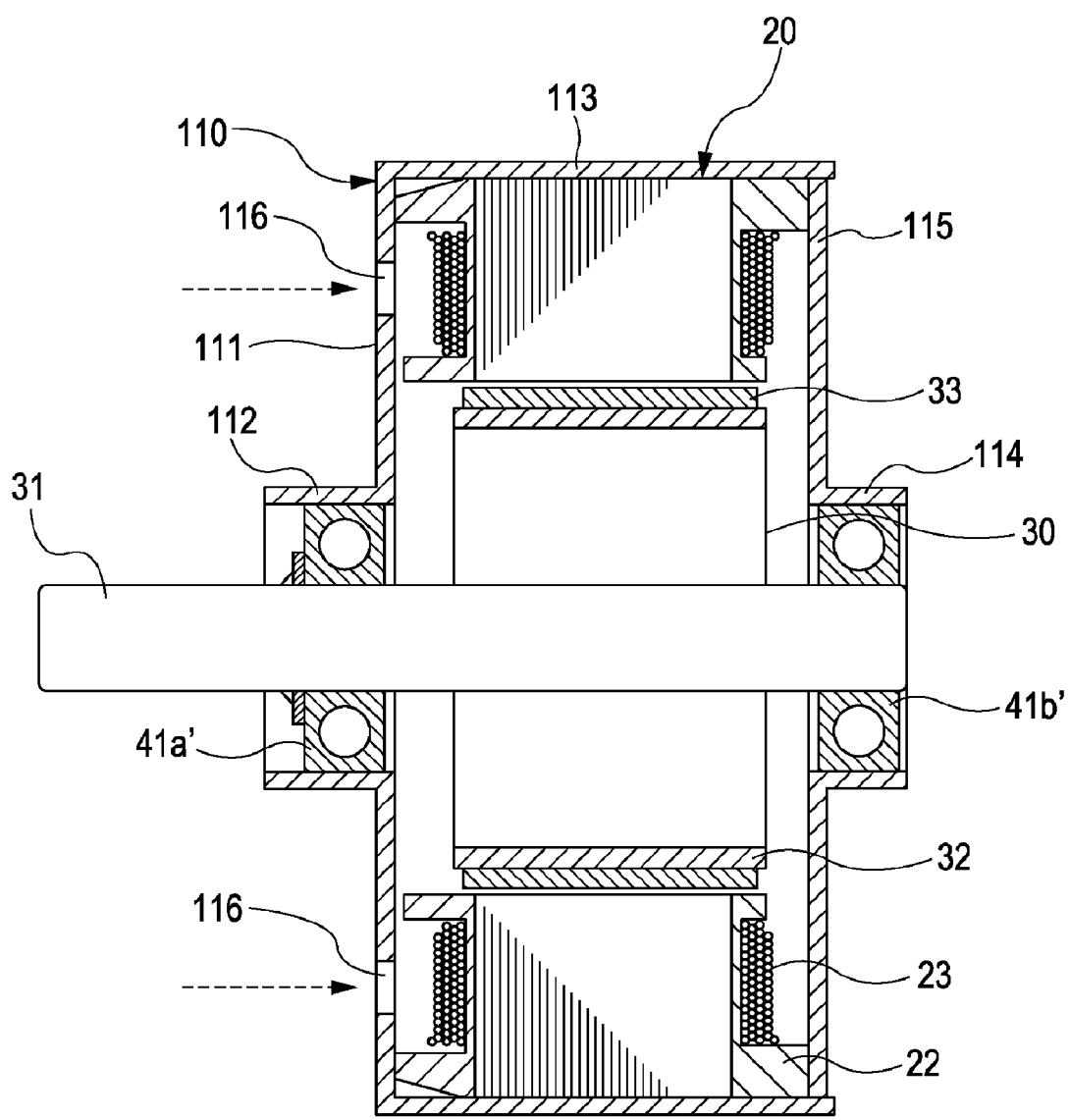
FIG. 5 is a longitudinal sectional view of another example motor housing before improvement.

First, the housing 10, which is a distinctive feature of this exemplary embodiment, will be described. FIGS. 4 and 5 illustrate example structures of housings before improvement. In FIG. 4, a frame 106 is fastened to a main base 100 using screws 42. The main base 100 includes a mounting surface 101 that holds the bottom surface of a stator, a mating portion 102 also serving as a bush portion of a lower bearing 41a', and mounting flanges 103. The frame 106 includes an outer cylindrical portion 104 that holds the outer periphery of a stator core and a bush portion 105 that supports a shaft so as to be rotatable at the top surface of the frame via an upper bearing 41b'. Although this motor having the structure shown in FIG. 4 can be installed in a mating member by fastening the motor from the front using screws, the number of parts is large, and accuracy in shaft inclination cannot be secured.

In FIG. 5, a mating portion 112, also serving as a bearing bush portion, of a motor-mounting surface 111 and an outer cylindrical portion 113 for a stator core are integrated into a single frame 110, and a bush portion 114 for an upper bearing 41b' is integrated with a top plate 115. Since the two bush portions for the lower and upper bearings are formed in two separate parts, i.e., in the frame 110 and the top plate 115, respectively, as in the bush portions shown in FIG. 4, the motor has the same problem as that shown in FIG. 4 as regards the shaft inclination. Moreover, since the motor does not have any mounting flanges, the motor needs to be screwed to a mating member by inserting screws into screw holes 116 formed in the mounting surface from the back surface of the mating member. This leads to a poor work efficiency.

In contrast, the housing 10 according to this exemplary embodiment includes the bent portions 13 extending upward from the mounting surface 11 substantially perpendicular to the mounting surface 11 and holding the outer circumferential surface of the stator core, the mounting flanges for fastening the motor to a mating member, and the like integrated with each other as described with reference to FIGS. 1 and 2. This structure can solve the above-described problems. In other words, this leads to a reduction in costs due to a reduction in the number of parts and secures the mounting work efficiency due to the integration of the mounting flanges at the same time. Moreover, the accuracy in the shaft inclination can be improved due to the integration of the bearing bushes.

Second Feature

Next, the positional relationship between the stator core 20 and the housing 10, which is another distinctive feature of this exemplary embodiment, will be described.

Figure 6:
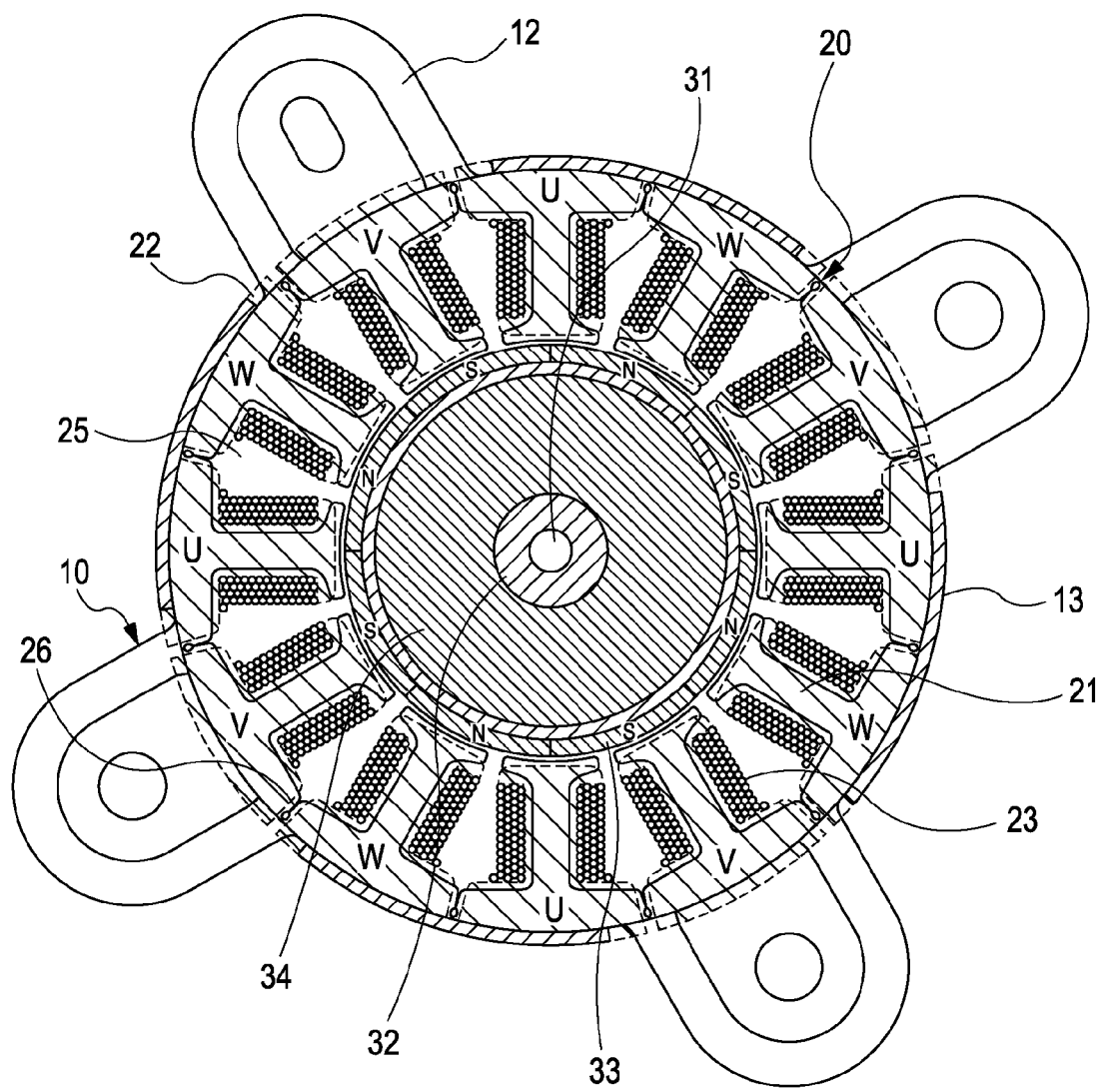
FIG. 6 is a transverse sectional view illustrating a case where a housing and a stator core are assembled in an improper phase position.

FIG. 6 illustrates the housing 10 and the stator core 20 assembled in a phase position differing from that shown in FIG. 2. The phase position shown in FIG. 6 is that before improvement.

In the phase positions shown in FIG. 6, the boundary portions 26 between the U-phase coils and the W-phase coils correspond to the centers of the bent portions 13 of the housing 10. As a result, the boundary portions between the U-phase coils and the V-phase coils adjacent to each other in the circumferential direction and the boundary portions between the V-phase coils and the W-phase coils adjacent to each other in the circumferential direction are located at the positions of the mounting flanges 12, and are not in contact with the bent portions 13.

On the other hand, as shown in FIG. 2, the centers of the U-phase coils correspond to those of the bent portions 13, and only the boundary portions between the V-phase coils and the W-phase coils are not in contact with the bent portions in the phase position according to this exemplary embodiment. Differences in magnetic paths made by these two phase positions will now be described.

Simulation Results

Figure 7:
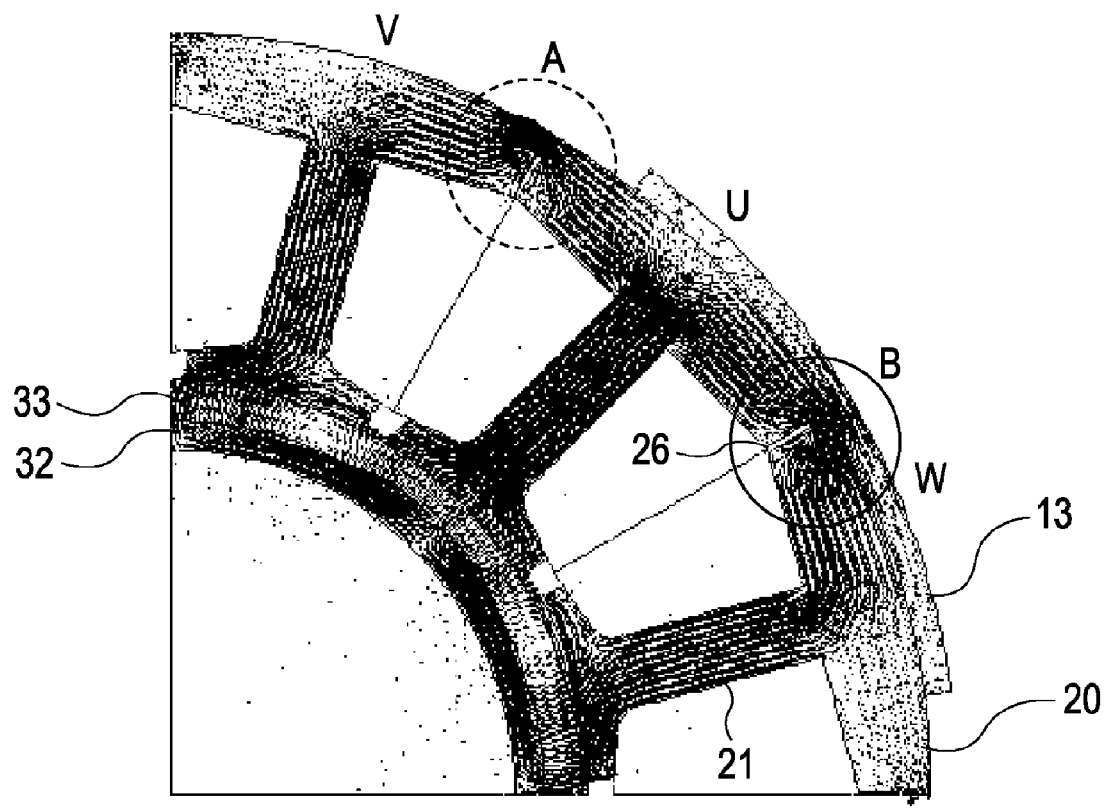
FIG. 7 illustrates a simulation result of density distribution of magnetic fluxes inside the motor when the housing and the stator core are assembled in the improper phase position.
Figure 8:
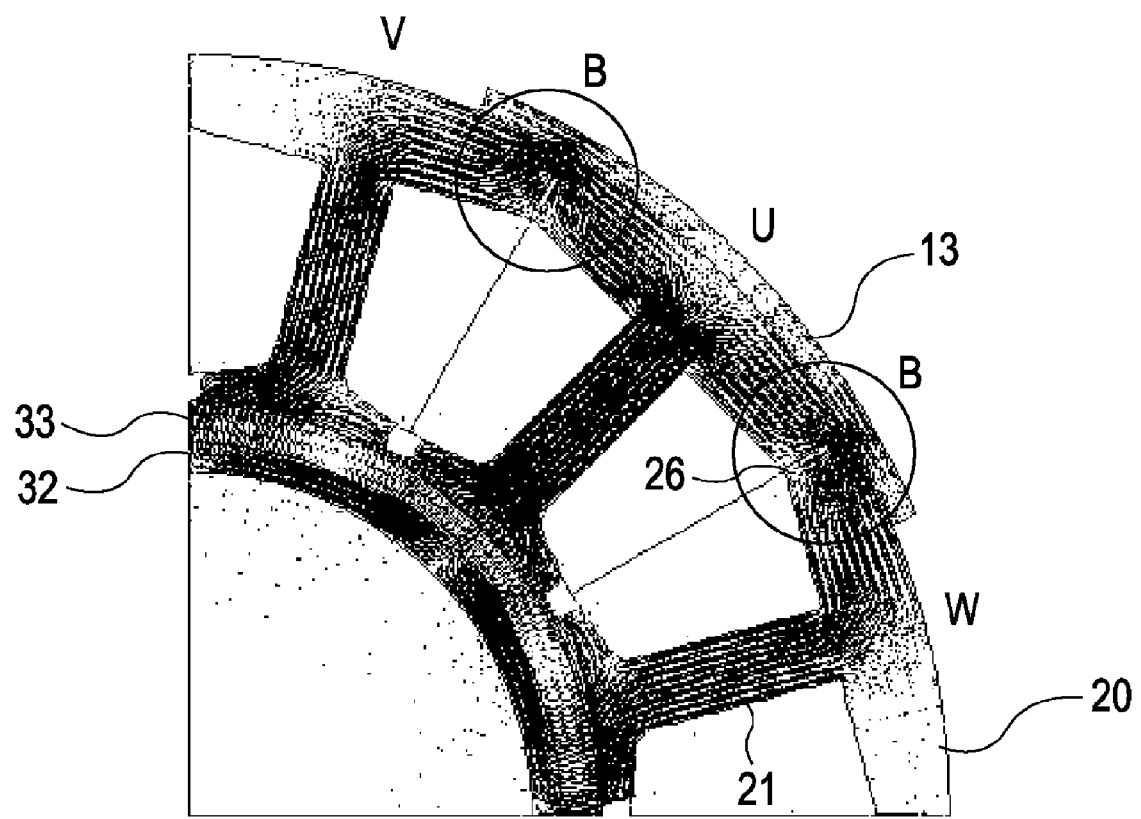
FIG. 8 illustrates a simulation result of density distribution of magnetic fluxes inside the motor when the housing and the stator core are assembled in a proper phase position.

FIGS. 7 and 8 illustrate simulation results of density distributions of magnetic fluxes inside the motor while the rotor rotates obtained by magnetic-field analysis.

In FIGS. 7 and 8, the magnetic flux density is higher as the color density is increased. The housing 10 and the stator core 20 shown in FIG. 7 are assembled in the phase position shown in FIG. 6, and those shown in FIG. 8 are assembled in the phase position shown in FIG. 2. The thickness of the back yoke of the stator core 20 is the smallest at the boundary portions 26 between two adjacent slots in the radial direction.

As shown by a circle A in FIG. 7 indicated by a dotted line, magnetic saturation occurred at the boundary portions where no bent portions 13 existed at the outer circumferential surfaces of the boundary portions due to concentration of magnetic fluxes. The same applies to the boundary portions between the V-phase coils and the W-phase coils in FIG. 2 and the boundary portions between the U-phase coils and the V-phase coils and between the V-phase coils and the W-phase coils in FIG. 6.

On the other hand, as shown by circles B in FIGS. 7 and 8 indicated by solid lines, the bent portions 13 of the housing 10 function as back yokes at the boundary portions where the bent portions 13 exist at the outer circumferential surfaces of the boundary portions 26. Thus, magnetic fluxes also flow into the bent portions in addition to the boundary portions of the core, and the concentration of the magnetic fluxes is relieved. Therefore, magnetic saturation did not easily occur at the portions shown by the circles B compared with the portion shown by the circle A. The same applies to the boundary portions between the U-phase coils and the V-phase coils and between the U-phase coils and the W-phase coils in FIG. 2 and the boundary portions between the U-phase coils and the W-phase coils in FIG. 6.

While only four of twelve boundary portions 26 are covered with the bent portions 13 at the outer circumferential surfaces thereof in the phase position shown in FIG. 6, eight boundary portions 26, which are twice as many as those shown in FIG. 6, are covered with the bent portions 13 in the phase position shown in FIG. 2.

The difference between these magnetic circuits appears as a difference in cogging torque. Cogging occurs depending on the positional relationship between the magnetic poles of the rotor 30 and the tips of the tooth portions 21 of the stator core 20 regardless of energization of the energizing coils 23, and becomes a factor of jitter (rotational fluctuation) of the motor. That is, cogging components in the jitter are reduced as the cogging torque decreases.

Figure 9:
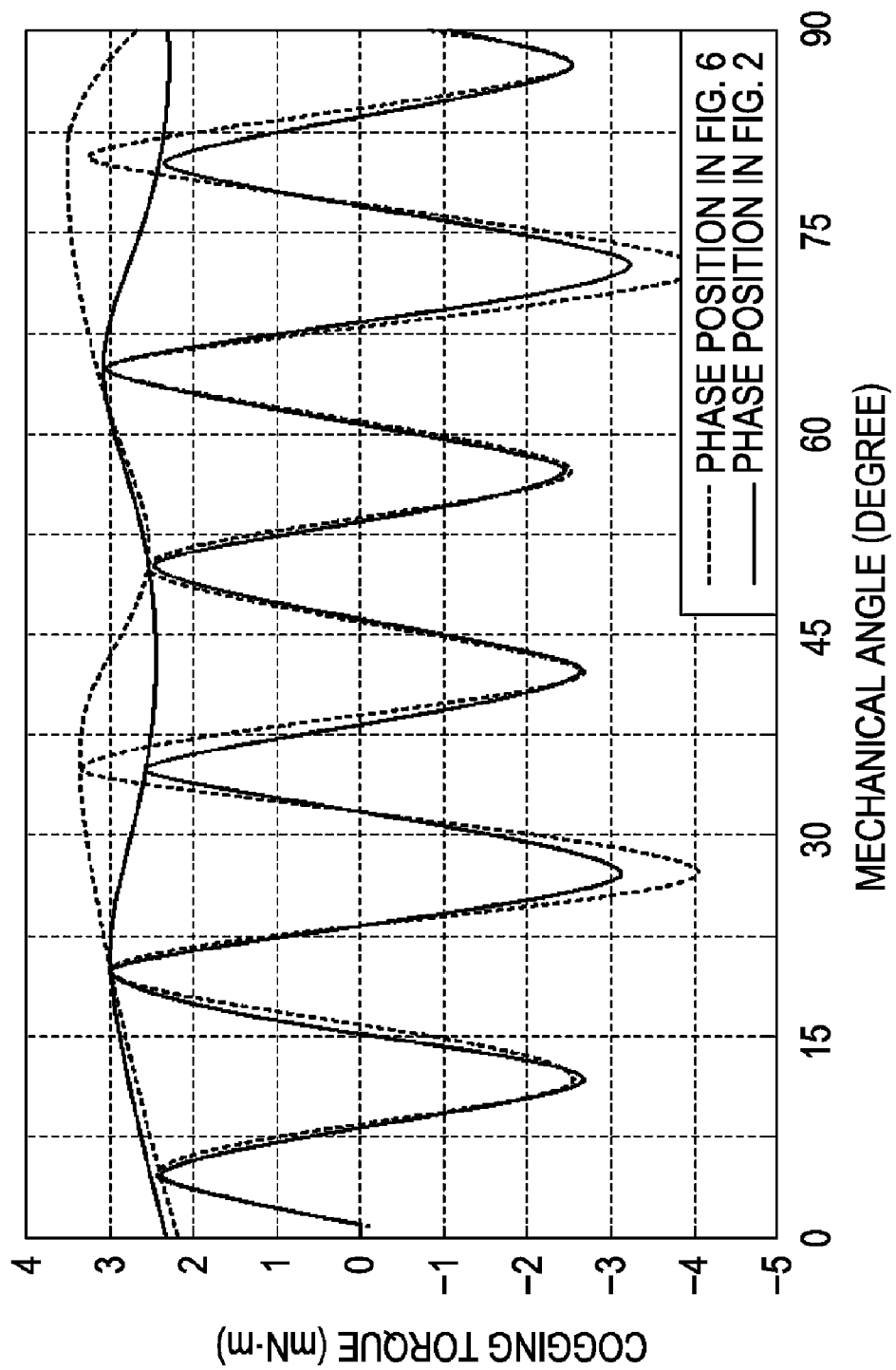
FIG. 9 illustrates simulation results showing the relationship between the cogging torque and the mechanical angle when the housing and the stator core are assembled in the phase positions shown in FIGS. 2 and 6.

FIG. 9 illustrates simulation results obtained by calculating the cogging torques in both the phase positions. The ordinate represents the magnitude of the cogging torque (mN·m), and the abscissa represents the mechanical angle (°), i.e., the rotational angle of the rotor 30.

A thin dotted line indicates the cogging torque in the phase position shown in FIG. 6, and a thin solid line indicates the cogging torque in the phase position shown in FIG. 2. There were big differences between the cogging torques when the mechanical angles, i.e., the rotational angles of the rotor were about 30° and about 75°, and the cogging torque decreased when the motor was assembled in the phase position shown in FIG. 2. Moreover, ripple components of peaks in both the cogging torques (envelope curves indicated by a thick dotted line and a thick solid line) exhibited periodicity that had two cycles in a range of the mechanical angle from 0° to 90°, and the amplitude of the ripple component in the phase position shown in FIG. 2 was smaller than that in the phase position shown in FIG. 6 as expected.

In a three-phase brushless motor having eight driving magnets and twelve slots, the rotor rotates by 90°, that is, the mechanical angle advances by 90° when the phase-energizing state shown in FIG. 6 makes a circuit, that is, when the electrical angle advances by 360°. With consideration of this and the periodicity of the ripple components described with reference to FIG. 9, it is conceivable that eight torque ripples appear during a rotation of the rotor.

Experimental Results

Figure 10:
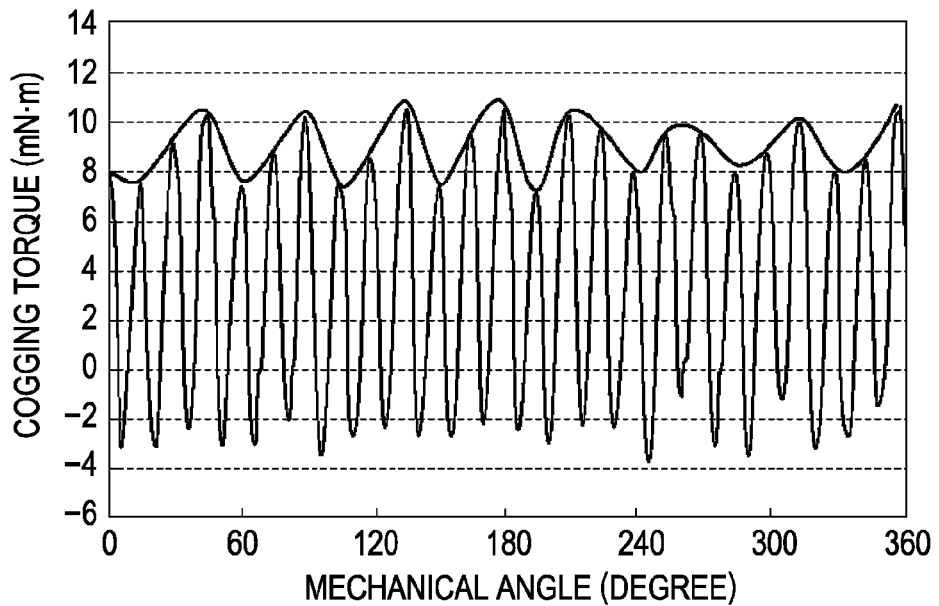
FIG. 10 illustrates example measurement data showing the relationship between the cogging torque and the mechanical angle when the housing and the stator core are assembled in the phase positions shown in FIGS. 2 and 6.
Figure 10:
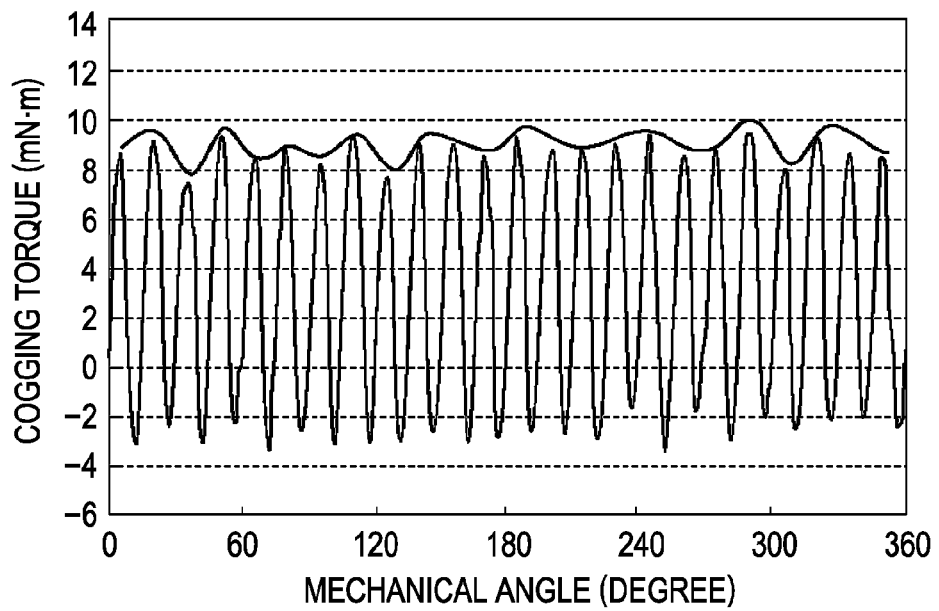
Figure 11:
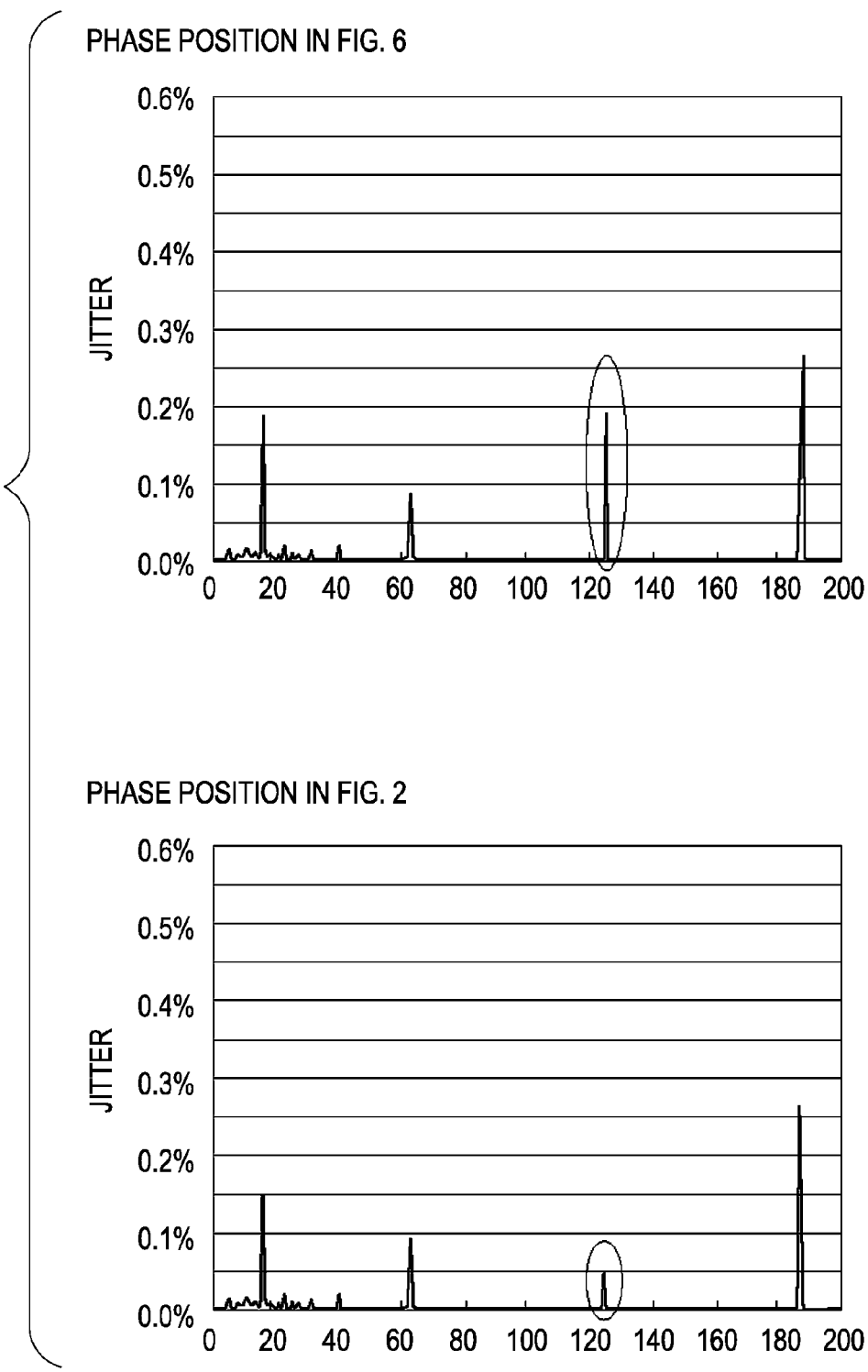
FIG. 11 illustrates example measurement data of jitter in terms of frequency when the housing and the stator core are assembled in the phase positions shown in FIGS. 2 and 6.

On the basis of the descriptions above and the simulation results, the cogging torques and the jitter of the motor were measured. FIGS. 10 and 11 illustrate measurement data of the cogging torques and the jitter of the motor, respectively, in the phase positions shown in FIGS. 2 and 6.

In FIG. 10, the ordinate represents the magnitude of the cogging torque (mN·m), and the abscissa represents the rotational angle (°) of the rotor 30. In FIG. 11, the ordinate represents the magnitude of the jitter (%), and the abscissa represents the frequency (Hz).

In FIG. 10 illustrating the cogging torques, the absolute values differed slightly from those in the simulation results. Except for this, however, there were big differences between the ripple components of the peaks (envelope curves indicated by thick solid lines), and in addition, eight ripples appeared during a rotation of the rotor similarly to the simulation results.

In FIG. 11 illustrating FFT results of the jitter, as indicated by portions surrounded by ovals, there was a big difference at a frequency component that is eight times the rotational frequency of the rotor. Both results showed that the ripple component and the jitter were reduced in the phase position shown in FIG. 2. In this manner, the phase position shown in FIG. 2 in which two or more boundary portions 26 that are not in contact with any of the bent portions 13 are not disposed in series can secure a high rotational accuracy. More specifically, a high rotational accuracy with less cogging torque (jitter), in particular, at the frequency component that is eight times as high as the rotational frequency of the rotor can be secured compared with the phase position shown in FIG. 6 in which two boundary portions 26 that are not in contact with any of the bent portions 13 are disposed in series.

Although the brushless motor according to this exemplary embodiment is of a three-phase type and has eight driving magnets and twelve slots, the scope of the present invention is not limited to this as a matter of course. Moreover, although the installation intervals of the four mounting flanges 12 and the four bent portions 13 are both 90°, the scope of the present invention is also not limited to this.

Effects of First Exemplary Embodiment

As described above, the bent portions that extend upward from the mounting surface substantially perpendicular thereto and hold the outer circumferential surface of the stator core, the mounting flanges for fastening the motor to a mating member, and the like are integrated into a single part. This leads to a reduction in costs due to a reduction in the number of parts and secures an excellent work efficiency.

In addition, since the housing 10 is integrated with the mating portion engaged with the mating member in which the motor is installed and positioning the motor in the radial direction, the number of parts can be reduced, and the relative positional relationship between the motor and the mating member engaged with the motor via the mating portion can be accurately maintained. This leads to a reduction in costs and secures a high rotational accuracy.

Furthermore, the housing is integrated with the bush portion holding the bearings that support the shaft so as to be rotatable in the circumferential direction. With this, the number of parts can be reduced, and the relative positional relationship between the housing and the rotor supported by the bush portion via the bearings can be accurately maintained. This leads to a reduction in costs and secures a high rotational accuracy.

In the case of FIG. 2, the stator core and the housing are assembled such that two or more boundary portions, among the boundary portions between two adjacent slots, that are not in contact with any of the bent portions separately disposed in the circumferential direction are not disposed in series in the circumferential direction. With this, the concentration of the magnetic fluxes at the boundary portions is relieved, and the torque ripples caused by the magnetic circuits can be suppressed. This also secures a high rotational accuracy.

Second Exemplary Embodiment

A second exemplary embodiment will now be described. Since the structure according to the second exemplary embodiment other than the shapes of the mounting flanges and the bent portions at the stator core is basically the same as that according to the first exemplary embodiment, detailed descriptions thereof will be omitted.

Figure 12:
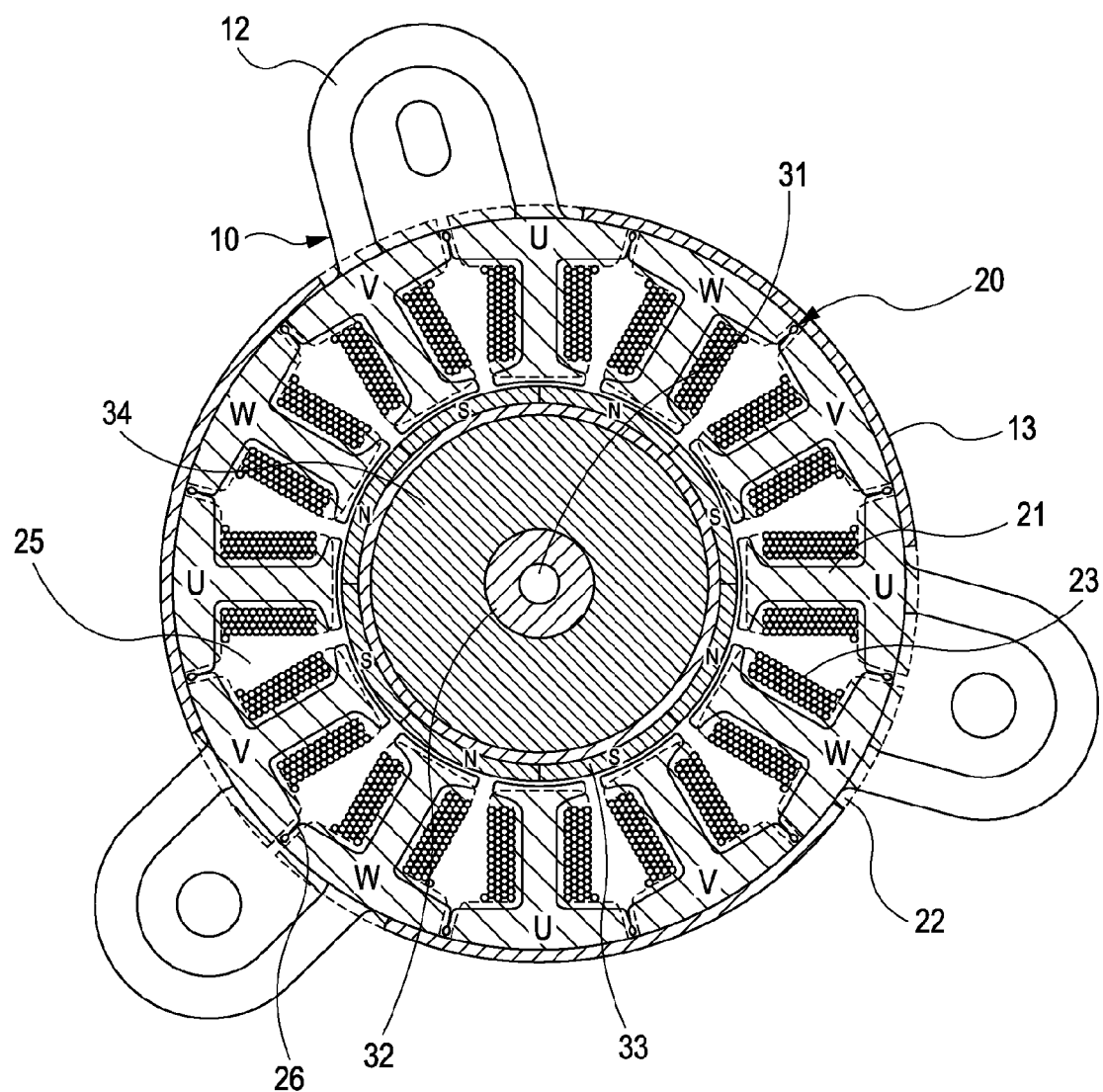
FIG. 12 is a transverse sectional view of an inner-rotor brushless motor according to a second exemplary embodiment of the present invention.

The second exemplary embodiment will now be described with reference to FIG. 12. FIG. 12 is a substantially transverse sectional view of an inner-rotor brushless motor according to the second exemplary embodiment. This motor includes three mounting flanges 12 and three bent portions 13 unlike the motor according to the first exemplary embodiment including the four mounting flanges 12 and the four bent portions 13. Moreover, the size of the bent portions 13 in the circumferential direction is increased as the number of the bent portions 13 is reduced. The installation intervals of the mounting flanges 12 and the bent portions 13 are both 120°.

In FIG. 12, the housing 10 and the stator core 20 are assembled such that the center of each of the bent portions 13 corresponds to the center of a boundary portion 26 between two adjacent slots. With this, only one boundary portion 26 that is not in contact with any of the bent portions 13 is disposed between two adjacent bent portions 13 in the circumferential direction.

Figure 13:
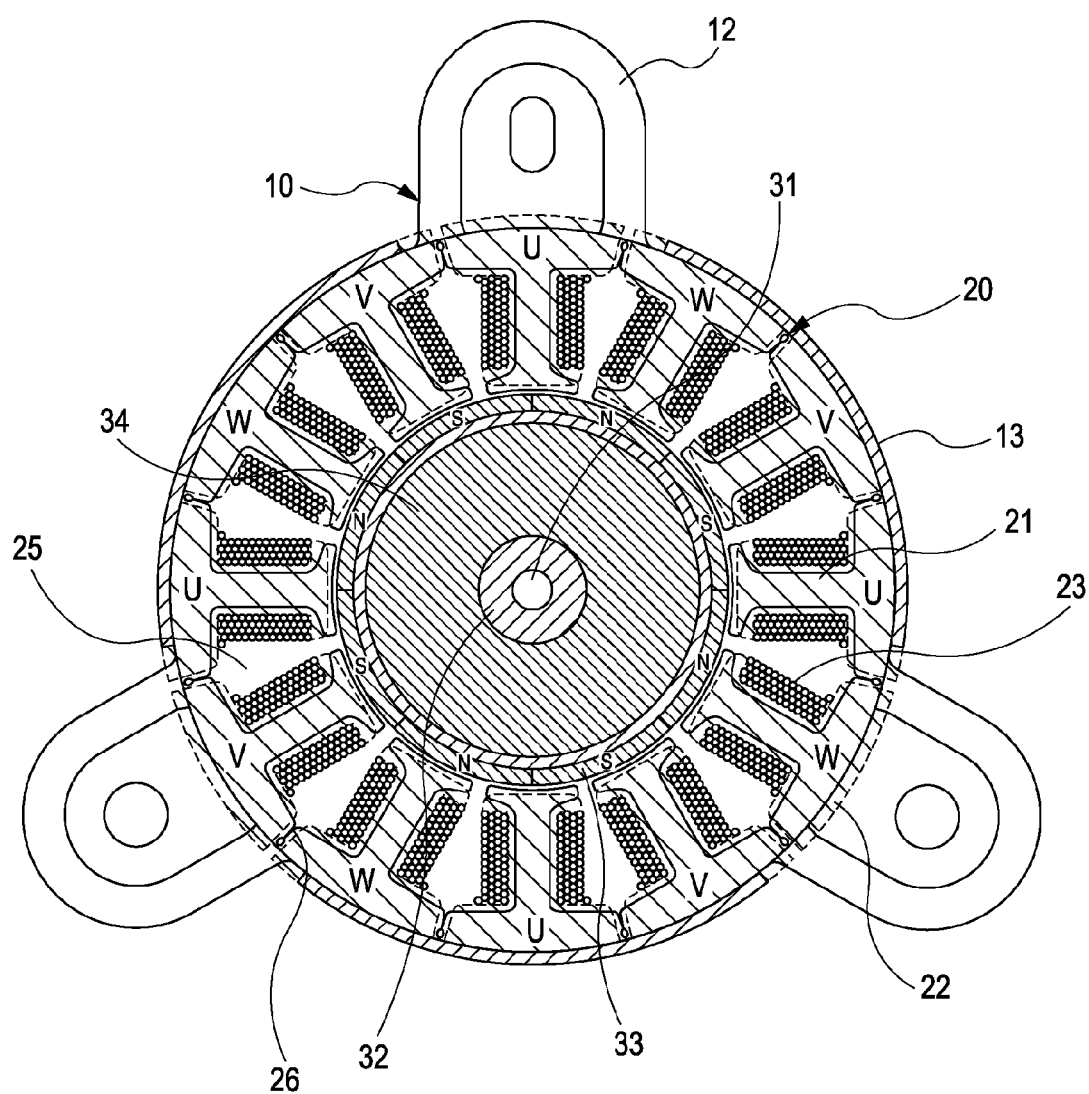
FIG. 13 is a transverse sectional view illustrating a case where the housing and the stator core are assembled in another improper phase position.

On the other hand, FIG. 13 illustrates the housing 10 and the stator core 20 assembled such that the phase position thereof differs from that shown in FIG. 12. In FIG. 13, the center of each of the bent portions 13 corresponds to the center of a slot. With this, two boundary portions 26 that are not in contact with any of the bent portions 13 are disposed in series in the circumferential direction.

Figure 14:
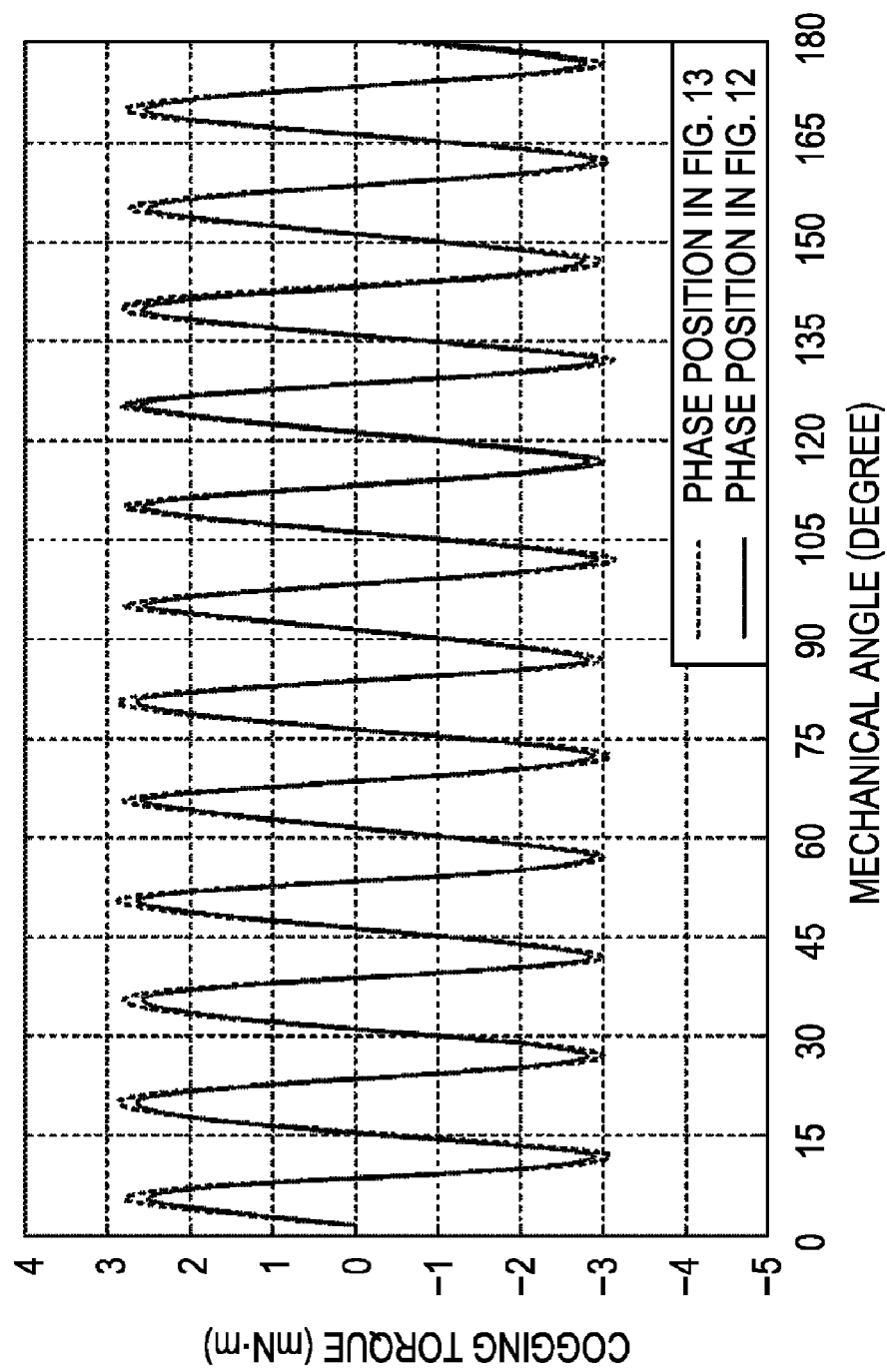
FIG. 14 illustrates simulation results showing the relationship between the cogging torque and the mechanical angle when the housing and the stator core are assembled in the phase positions shown in FIGS. 12 and 13.

The phase relationships between the bent portions 13 and the stator core 20 shown in FIGS. 12 and 13 are substantially the same as those shown in FIGS. 2 and 6, respectively, in the first exemplary embodiment. FIG. 14 illustrates simulation results obtained by calculating the cogging torques in both the phase positions.

In FIG. 14, the ordinate represents the magnitude of the cogging torque (mN·m), and the abscissa represents the mechanical angle (°), i.e., the rotational angle of the rotor 30. A thin dotted line indicates the cogging torque in the phase position shown in FIG. 13, and a thin solid line indicates the cogging torque in the phase position shown in FIG. 12. The cogging torque in the phase position shown in FIG. 12 where the number of the successive boundary portions 26 that are not in contact with any of the bent portions 13 is smaller than that in the phase position shown in FIG. 13 is reduced compared with the cogging torque in the phase position shown in FIG. 13.

It is conceivable that the volume of the reduced cogging torque is smaller than that in the first exemplary embodiment for the following two reasons. First, the absolute number of the boundary portions 26 that are not in contact with any of the bent portions 13 is reduced compared with that in the first exemplary embodiment due to an increase in the size of the bent portions 13 in the circumferential direction. This reduces factors in increasing the cogging torque.

Second, the boundary portions 26 that are not in contact with the bent portions 13 are not located at the coils of particular phases. In the first exemplary embodiment, the four mounting flanges 12 and the four bent portions 13 are both disposed at regular intervals of 90°, and the boundary portions 26 that are not in contact with the bent portions are located at the coils of particular phases. In contrast, the three mounting flanges 12 and the three bent portions 13 are both disposed at regular intervals of 120° in the second exemplary embodiment, and the boundary portions 26 that are not in contact with the bent portions 13 are not located at the coils of particular phases. That is, factors in increasing the cogging torque are dispersed compared with the phase position according to the first exemplary embodiment even when the housing and the stator core are disposed in the phase position shown in FIG. 13.

As described above, the stator core and the housing are assembled such that two or more boundary portions, among the boundary portions between two adjacent slots, that are not in contact with any of the bent portions separately disposed in the circumferential direction are not disposed in series in the circumferential direction. With this, the concentration of the magnetic fluxes at the boundary portions is relieved, and the torque ripples caused by the magnetic circuits can be suppressed. This also secures a high rotational accuracy.

Third Exemplary Embodiment

A third exemplary embodiment will now be described. Since the structure according to the third exemplary embodiment other than the shape of the bent portions at the stator core is basically the same as that according to the first exemplary embodiment, detailed descriptions thereof will be omitted.

Figure 15:
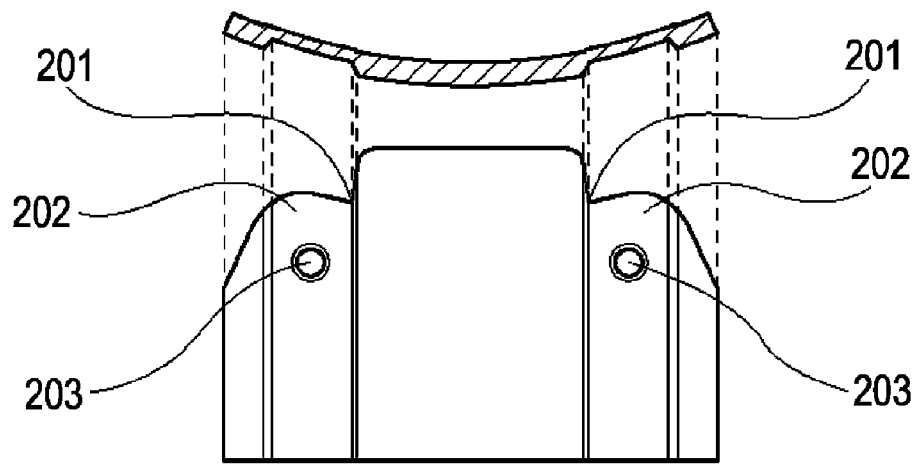
FIG. 15 illustrates an example shape of a bent portion of the housing according to a third exemplary embodiment of the present invention.
Figure 16:
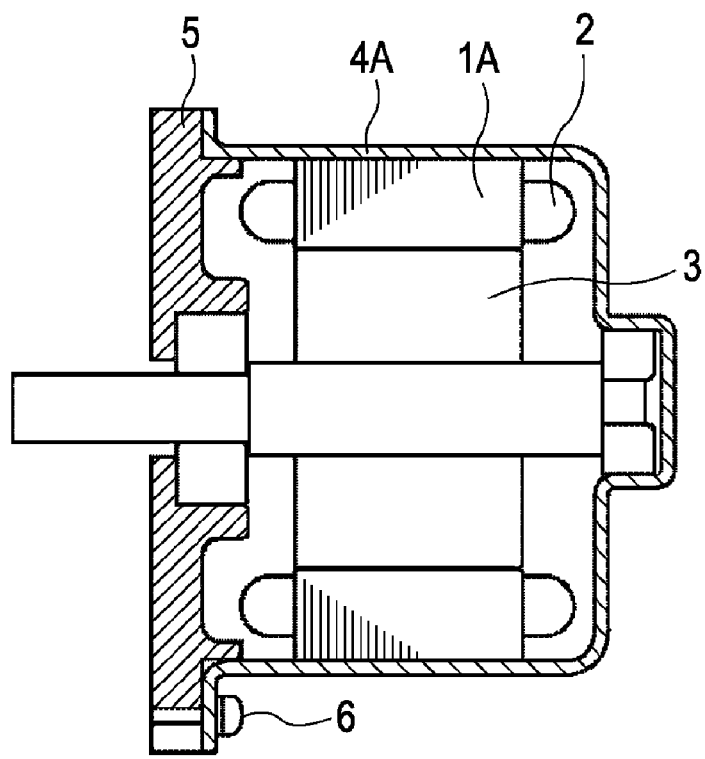
FIG. 16 is a longitudinal sectional view of a known inner-rotor brushless motor.

The third exemplary embodiment will now be described with reference to FIG. 15. FIG. 15 illustrates a bent portion 13 viewed from above and from the outside thereof. Two cut-off portions 201 are symmetrically formed in the bent portion 13, and the thickness of certain areas located outside the cut-off portions 201 are reduced when the bent portion 13 is bent upward from a flat plate by press working. With this, both end portions 202 outside the cut-off portions 201 are bent further inward. These portions improve adhesiveness between the stator core 20 and the housing 10 when the stator core 20 is assembled into the housing 10. Due to the improved adhesiveness, the stator core 20 can be reliably fixed to the housing 10 at welding spots 203 by laser welding.

As described above, the cut-off portions formed in the bent portion of the housing 10 adjacent to both ends of the bent portion in the circumferential direction facilitate inward deformation of the end portions outside the cut-off portions during upward bending of the bent portion by press working. This improves the adhesiveness between the bent portion and the stator core. Moreover, the housing 10 and the stator core 20 can be reliably fixed by laser welding.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-254001, filed Sep. 30, 2008 which is hereby incorporated by reference herein in its entirety.

What is claimed is:

1. An inner-rotor brushless motor comprising:
a stator core constituted by stator-core blocks connected to each other via thin-walled portions, each stator-core block including a tooth portion around which an energizing coil is wound inside the stator-core block;
a rotor disposed inside the stator core and including driving magnets, a rotor yoke that holds the driving magnets, and a shaft coaxially fastened with the rotor yoke; and
a holding member configured to hold the stator core, the holding member including,
a mounting surface disposed perpendicular to the shaft and brought into contact with a mating member in which the inner-rotor brushless motor is installed;
bent portions integrated with the mounting surface, bent upward so as to be substantially perpendicular to the mounting surface, and configured to hold an outer circumferential surface of the stator core; and
mounting flanges used for fastening the motor to the mating member, wherein
the mounting surface, the bent portions, and the mounting flanges are integrated with each other.

2. The inner-rotor brushless motor according to claim 1, wherein, among the thin-walled portions adjacent to each other, two or more thin-walled portions that are not in contact with any of the bent portions are not disposed in series in a circumferential direction of the motor.

3. The inner-rotor brushless motor according to claim 1, wherein the bent portions are separately disposed at regular intervals in a circumferential direction of the motor.

4. The inner-rotor brushless motor according to claim 1, wherein the holding member is integrated with a mating portion engaged with the mating member in which the motor is installed and configured to position the motor in a radial direction of the motor.

5. The inner-rotor brushless motor according to claim 1, wherein the holding member is integrated with a bush configured to hold bearings that support the shaft so as to be rotatable in a circumferential direction of the motor.

6. The inner-rotor brushless motor according to claim 1, wherein the holding member includes cut-off portions at both ends of each bent portion in a circumferential direction of the motor, and is laser-welded to the stator core at the end portions.

* * * * *